US007801406B2

(12) United States Patent
Pan et al.

(10) Patent No.: US 7,801,406 B2
(45) Date of Patent: Sep. 21, 2010

(54) METHOD OF FABRICATING GE OR SIGE/SI WAVEGUIDE OR PHOTONIC CRYSTAL STRUCTURES BY SELECTIVE GROWTH

(75) Inventors: Dong Pan, Andover, MA (US); Jifeng Liu, Cambridge, MA (US); Jurgen Michel, Arlington, MA (US); John Yasaitis, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/194,805

(22) Filed: Aug. 1, 2005

(65) Prior Publication Data
US 2007/0025670 A1 Feb. 1, 2007

(51) Int. Cl.
*G02B 6/10* (2006.01)
(52) U.S. Cl. ...................................... 385/132
(58) Field of Classification Search ............. None
See application file for complete search history.

(56) References Cited

U.S. PATENT DOCUMENTS

2003/0128927 A1* 7/2003 Wada et al. ............ 385/37

FOREIGN PATENT DOCUMENTS

EP 0336830 10/1989
FR 2840415 12/2003

OTHER PUBLICATIONS

Lee, Kevin K, Fabrication of Ultralow loss Si/Sio2 waveguides by roughness reduction, 12/1/2201 Optics Letters, vol. 26.*
Lee, Kevin K, High-quality Ge epilayers on Si with low threading-dislocation densities, Nov. 8, 1999, Applied Physics Letters vol. 75.*
"High-confinement SIGe low-loss waveguides for SI-based optoelectronics"; Pogossian et al., 1999 American Institute of Physics; Applied Physics Letters, vol. 75, No. 10; pp. 1440-1442.
"High-quality Ge epilayers on Si with low threading-dislocation densities"; Luan et al.; Department of Materials Science and Engineering; Massachusetts Institute of Technology; 1999 American Institute of Physics; Applied Physics Letters, vol. 77, No. 11; pp. 2909-2911.
Effect of size and roughness on light transmission in a $Si/SiO_2$ waveguide: Experiments and model; Lee et al., 2000 American Institute of Physics; vol. 77, No. 11, pp. 1617-1619.

(Continued)

*Primary Examiner*—Uyen-Chau N Le
*Assistant Examiner*—Hoang Tran
(74) *Attorney, Agent, or Firm*—Gauthier & Connors LLP

(57) ABSTRACT

A method of forming a low loss crystal quality waveguide is provided. The method includes providing a substrate and forming a dielectric layer on the substrate. A channel is formed by etching a portion of the dielectric layer. A selective growth of a Si Ge, or SiGe layer is performed in the area that defines the channel. Furthermore, the method includes thermally annealing the waveguide at a defined temperature range.

20 Claims, 5 Drawing Sheets

OTHER PUBLICATIONS

Nguyen et al., "Growth and optical properties of Ge/Si quantum dots formed on patterned SiO2/Si (001) substrates" Physica E Elsevier, Netherlands vol. 23, No. 3-4, Jul. 2004, pp. 471-475, XP002423684.

Kim et al., Control of GE Dots in Dimension and Position by Selective Epitaxial Growth and Their Optical Properties' Applied Physics Letters, AIP, American Institute of Physics, Melville, NY vol. 72, No. 13, Mar. 30, 1998, pp. 1617-1619, XP000742906.

Lee et al., "Fabrication of ultralow-loss Si/SiO2 waveguides by roughness reduction" Optics Letters, OSA, Optical Society of America, Washington, DC, US, vol. 26, No. 23, Dec. 1, 2001, pp. 1888-1890, XP002244938.

\* cited by examiner

METHOD OF FABRICATING GE OR SIGE/SI WAVEGUIDE OR PHOTONIC CRYSTAL STRUCTURES BY SELECTIVE GROWTH

BACKGROUND OF THE INVENTION

The invention relates to the field of Ge or SiGe waveguides for integrated optical circuits and far infrared application, and in particular to making low loss crystal quality waveguides and photonic crystal structures where there is no sidewall scattering loss from etching.

The waveguide structures often referred to when fabricating Ge or SiGe/Si waveguides are two structures: channel waveguides and ridge waveguides. These waveguide structures also come with the shape of bend, ring, microdisk or taper. One exemplary way to make them includes the deposition of one higher index material (core) whose the refractive index is higher than surrounding materials, and then etching the material into the channel (deep etch) or ridge (shallow etch) structure followed by a deposition of surrounding materials. For example, a semiconductor laser generally has a ridge waveguide structure.

The etching process usually defines the dimension of the waveguide. One of the challenges from etching is the formation of rough sidewalls which causes scattering loss. For high index contrast waveguides with dimensions close to or less than the propagation wavelength in the core materials, there is a large amount of scattering loss (>10 dB/cm) and this becomes more of a challenge with the decrease of dimensions used in waveguides.

This becomes a very serious problem for Ge based waveguide since Ge's refractive index is among the highest (~4.0) which require much smaller size than conventional materials such as Si waveguide. The state of the art high index contrast Si waveguide has a loss of ~10 dB/cm before any smoothing treatment, with a RMS roughness of >5 nm. The roughness inevitably introduces more loss when the light passes through it. For SiGe with high content Ge, it has been shown that the sidewalls produced by standard dry etching processes are very rough (~10 nm RMS roughness), leading to a loss of ~20 dB/cm. Another challenge is the complicated layering in an integrated optoelectronic circuit where the electronic and optical circuits run together in different layers. It is very convenient if one can reduce the number of layers or try to do both circuits functions on the same layer.

High index contrast systems are also ideal for photonic crystal structures. Photonic crystal structure is gaining more and more interest recently because of its unique properties. However, the photonic crystal structures demonstrated up to date still suffer from significant losses although there should be no loss in theory. This is again due to the side wall roughness of the photonic structures resulting from dry etching processes. Therefore, the performance of photonic structures could be greatly improved if the sidewall roughness problem could be solved.

Ge/Si materials are also one of the important far infrared optical materials (wavelength of 8~12 μm and 3~5 μm) because there is no absorption at all when the wavelength is larger than 2 um and a major materials for infrared lens. Given the fact that integrated optics is moving into infrared application, there is also need to fabricate the low loss waveguide for infrared application.

SUMMARY OF THE INVENTION

According to one aspect of the invention, there is provided a low loss crystal quality waveguide. The waveguide includes a substrate and a dielectric layer that is formed on the substrate. A channel is formed by etching a portion of the dielectric layer. A selective growth of a Si, Ge, or SiGe layer is performed in the area that defines the channel. The waveguide is annealed at a defined temperature range to improve the crystal quality.

According to another aspect of the invention, there is provided a photonic crystal structure. The photonic structure includes a substrate and a dielectric layer that is formed on the substrate. An array of holes are formed by etching a portion of the dielectric layer. A selective growth of a Si, Ge, or SiGe layer is performed in these holes. The photonic crystal structure is annealed at a defined temperature range to improve the crystal quality.

According to another aspect of the invention, there is provided a method of forming a low loss crystal quality waveguide. The method includes providing a substrate and forming a dielectric layer on the substrate. A channel is formed by etching a portion of the dielectric layer. A selective growth of a Si, Ge or SiGe layer is performed in the area that defines the channel. Furthermore, the method includes thermally annealing the waveguide at a defined temperature range to improve the crystal quality. A chemical mechanical polishing (CMP) process can be provided to flatten the overgrowth of SiGe when necessary.

According to another aspect of the invention, there is provided a method of forming a photonic crystal structure. The method includes providing a substrate and forming a dielectric layer on the substrate. An array of holes are formed by etching a portion of the dielectric layer. A selective growth of a Si, Ge, or SiGe layer is performed in these holes. The waveguide is annealed at a defined temperature range to improve the crystal quality.

DETAILED DESCRIPTION OF THE INVENTION

The invention involves an inventive technique to make low loss crystal quality waveguides by selective growth, where there is no sidewall scattering loss from etching. The core idea is to grow a Si, Ge or SiGe waveguide directly on a small Si area surrounded by $SiO_2$, since Ge or SiGe cannot grow on the top of $SiO_2$.

Figure 1:
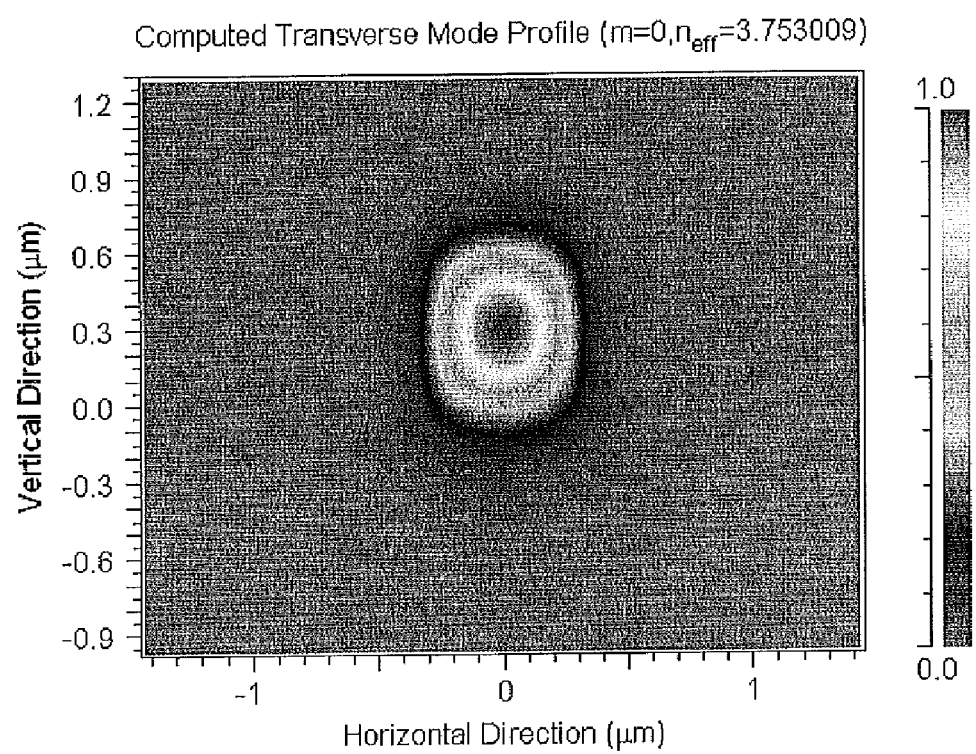
FIG. 1 is a graph demonstrating the mode profile of a waveguide structure having core dimensions less than the propagation wavelength in a core material.

FIG. 1 shows the mode profile of a waveguide structure having dimensions less than the propagation wavelength in the core material (in this case λ=1.55 μm). At this dimension, the scattering of light due to side wall roughness becomes very significant. This illustrates the constraints being faced and how difficult to attend waveguide structure to operate efficiently at those ranges.

Figure 2A:
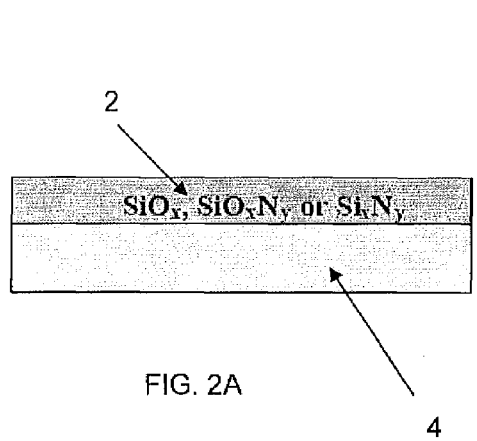
FIGS. 2A-2D are schematic diagrams illustrating the steps followed according to the invention.
Figure 2B:
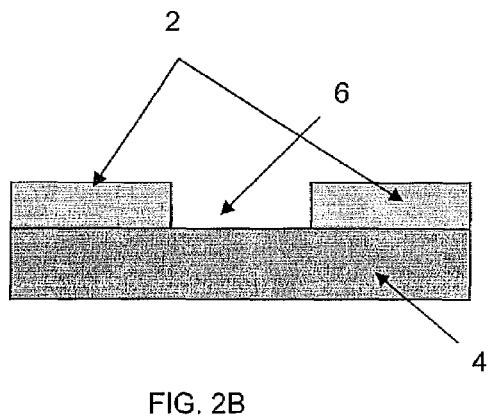
Figure 2C:
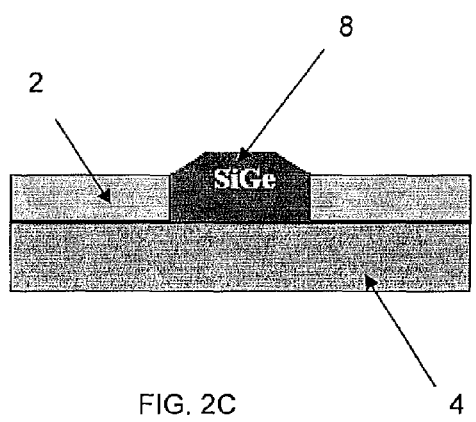
Figure 2D:
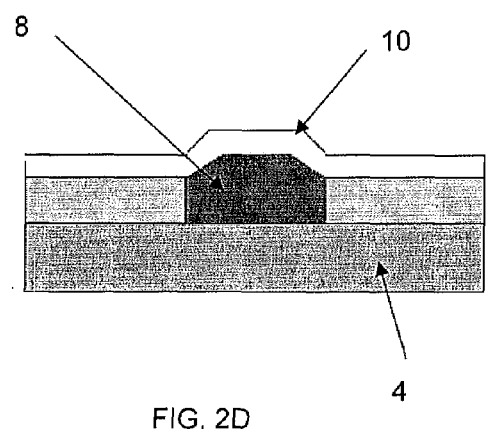

FIGS. 2A-2D are schematic diagrams illustrating the steps followed according to the invention. A Si substrate 4 is provided and a SiO$_2$ layer 2 is either formed or deposited on the Si substrate 4, as shown in FIG. 2A. Note other materials beside SiO$_2$ can also be used in accordance with the invention, such as silicon oxide (SiO$_x$), nitride (Si$_x$N$_y$), oxynitride (SiO$_x$N$_y$) or any other materials having similar properties. A channel 6 is formed by etching the layer 2, as shown in FIG. 2B. The selective growth of a Si or SiGe layer 8 is performed in the area that defines the channel 6. The use of UHCVD or LPCVD can be used for the growth of either the Si, Ge or SiGe layer 8, as shown in FIG. 2C. Materials having an index lower than SiGe can be used to form an uppercladding 10, as shown in FIG. 2D. Note that this step is not required. Afterwards, the whole wafer is thermally annealed at a defined temperature range between 700 and 900C. The overgrown SiGe (the part above the surface of the dielectric layer) can be removed by CMP process when necessary.

Figure 3A:
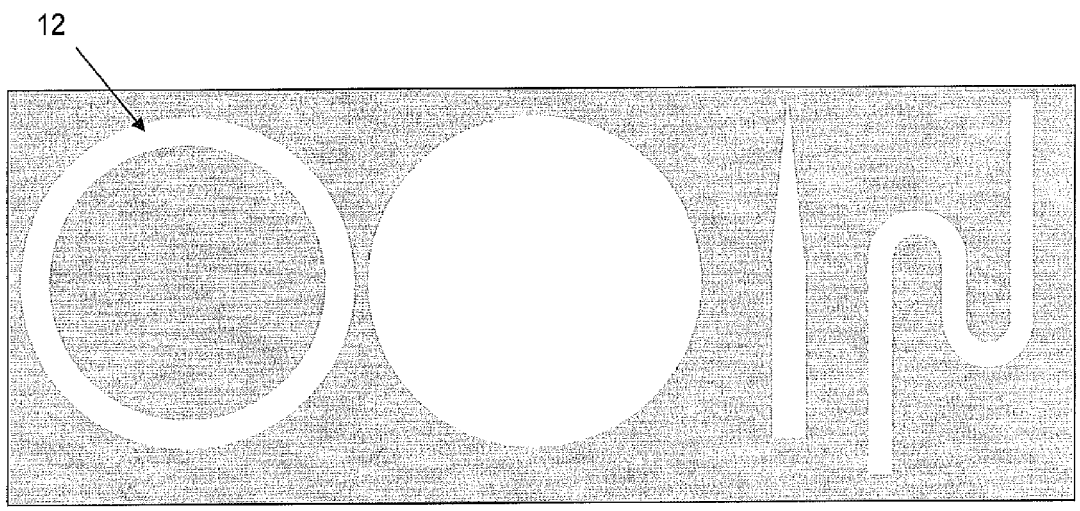
FIGS. 3A-3B are schematic diagrams illustrating a micro disk/ring resonator formed in accordance with the invention.
Figure 3B:
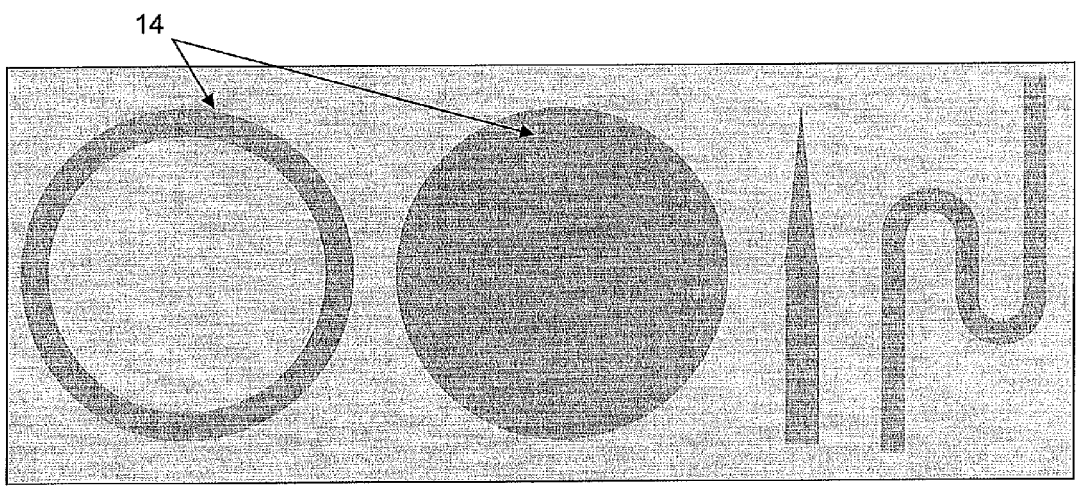

A micro disk/ring resonator 12 can also be selectively grown close to the waveguide using the same technique. In that case, a circle/donut shaped opening can be etched through the oxide/nitride/oxynitride layer, as shown in FIG. 3A, and a SiGe disk/ring 14 can be selectively grown in the circle/donut regime, as shown in FIG. 3B. Other structures like bends or tapers can be achieved in a similar way.

Figure 4A:
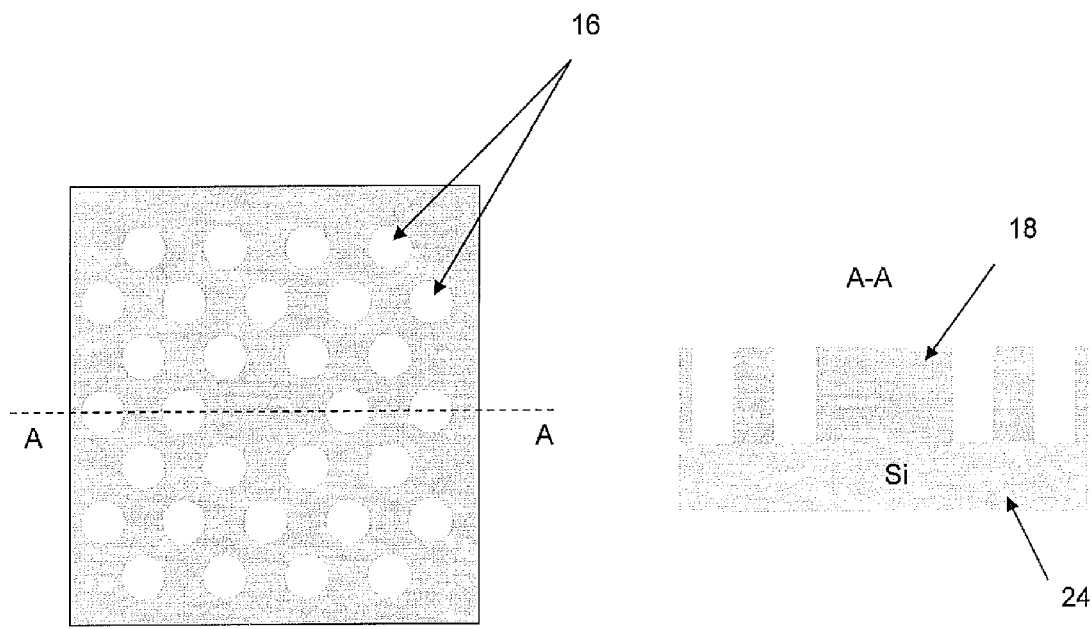
FIG. 4A-4B are schematic diagrams illustrating a photonic crystal structure with a defect mode formed in accordance with this invention.
Figure 4B:
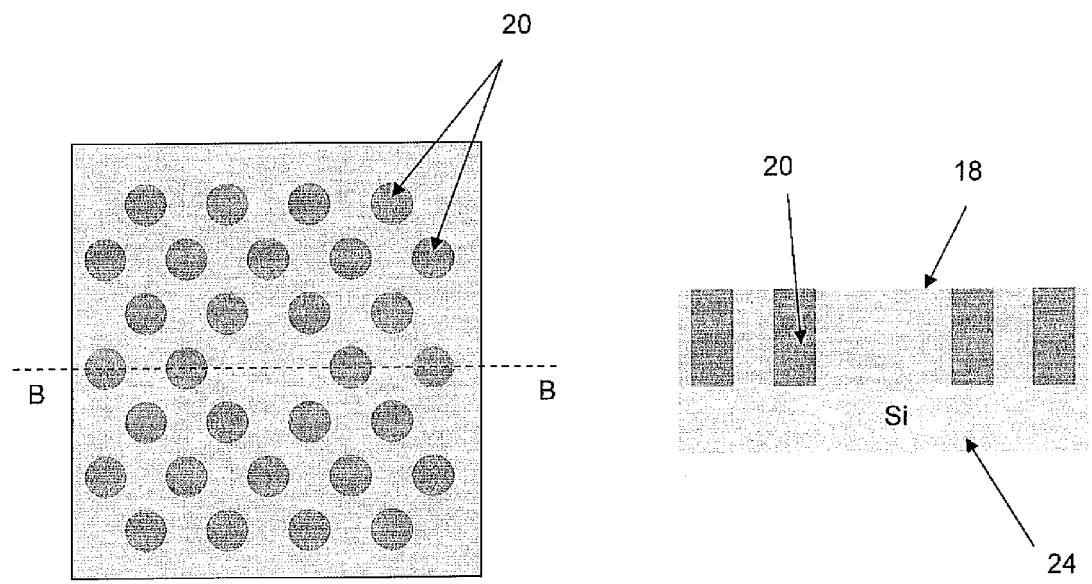

The same method can also be applied to form photonic crystal structures, as shown schematically in FIGS. 4A-4B. In this case, an array of holes 16 can be opened and etched through the oxide/nitride/oxynitride layer 18 that was formed on the Si substrate 24, as shown in FIG. 4A. The Si, Ge or SiGe material 20 can be selectively grown in these holes 18 using the techniques described in FIGS. 2A-2D. In this way, a high index contrast ($\Delta$n>2) photonic crystal structure 22 can be achieved.

Figure 5:
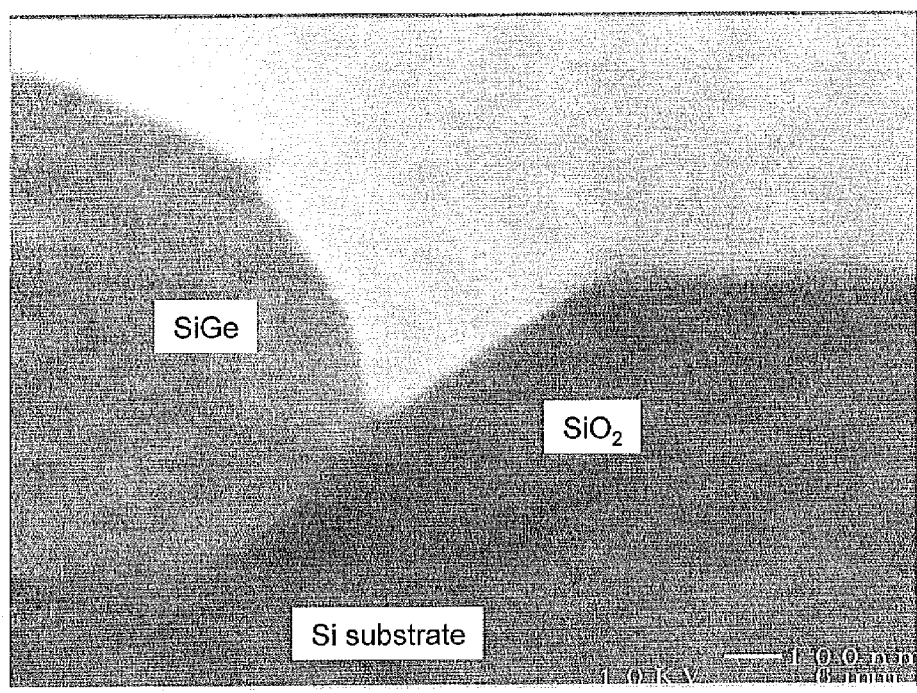
FIG. 5 is a cross-sectional SEM picture of the SiGe waveguide grown in a trench opened on $SiO_2$ according to this invention.

The advantage of this inventive technique lies in the formation of very narrow waveguides with single mode dimensions that can be readily achieved since current CMOS processing is able to etch oxide trenches as narrow as 90 nm. The sidewalls of Ge or SiGe waveguides/resonators can be very smooth because it is comprised of facets of crystal planes (1-2 nm RMS roughness compared to 5-10 nm roughness in the cases of etched waveguides). As an example, FIG. 5 shows the cross-section of SiGe grown in a trench with smooth side wall structure. This is crucial for lowering the loss in waveguide/resonator structures and high index integrated circuits.

Although the present invention has been shown and described with respect to several preferred embodiments thereof, various changes, omissions and additions to the form and detail thereof, may be made therein, without departing from the spirit and scope of the invention.

What is claimed is:

1. A method of forming a low loss crystal quality waveguide comprising:
    providing a substrate;
    forming a dielectric layer on the substrate;
    forming a channel by etching a portion of said dielectric layer, said channel comprises the shape of a ring or micro-ring;
    smoothing the sidewalls of the channel so as to have a root mean square roughness of less than 2 nm;
    selectively growing a continuous and uniform strip of single crystal SiGe, Ge or Si continuously and uniformly within the channel so as to completely fill the channel;
    planarizing the top surface of the continuous and uniform strip of single crystal by chemical mechanical polishing;
    forming an uppercladding over said single crystal that comprises materials having an index lower than SiGe; and
    thermally annealing said above mentioned layers at a defined temperature range.

2. The method of claim 1, wherein said substrate comprises Si.

3. The method of claim 1, wherein said dielectric layer comprises silicon oxide (SiO$_x$).

4. The method of claim 1, wherein said dielectric layer comprises nitride (Si$_x$N$_y$).

5. The method of claim 1, wherein said dielectric layer comprises oxynitride (SiO$_x$N$_y$).

6. The method of claim 1, wherein said dielectric layer comprises silicon dioxide (SiO$_2$).

7. The method of claim 1, wherein said selective growth comprises UHCVD.

8. The method of claim 1, wherein said selective growth comprises LPCVD.

9. The method of claim 1, wherein said temperature range between 700 and 900C.

10. The method of claim 1 further comprising an uppercladding that comprises materials having an index lower than SiGe.

11. A low loss crystal quality waveguide comprising:
    a substrate;
    a dielectric layer that is formed on the substrate;
    a channel that is formed by etching a portion of said dielectric layer with smoothed sidewalls so as to have a root mean square roughness of less than 2 nm, said channel comprises the shape of a ring or micro-ring;
    a continuous and uniform strip of single crystal comprising SiGe Ge, or Si layer that is selectively grown within the channel so as to completely fill the channel where the top surface of the continuous and uniform strip of single crystal is planarized; and an uppercladding that is formed over said continuous and uniform single crystal comprising materials having an index lower than SiGe; wherein said above mentioned layers are annealed at a defined temperature range.

12. The low loss crystal quality waveguide of claim 11, wherein said substrate comprises Si.

13. The low loss crystal quality waveguide of claim 11, wherein said dielectric layer comprises silicon oxide (SiO$_x$).

14. The low loss crystal quality waveguide of claim 11, wherein said dielectric layer comprises nitride (Si$_x$N$_y$).

15. The low loss crystal quality waveguide of claim 11, wherein said dielectric layer comprises oxynitride (SiO$_x$N$_y$).

16. The low loss crystal quality waveguide of claim 11, wherein said dielectric layer comprises silicon dioxide (SiO$_2$).

17. The low loss crystal quality waveguide of claim 11, wherein said selective growth comprises UHCVD.

18. The low loss crystal quality waveguide of claim 11, wherein said selective growth comprises LPCVD.

19. The low loss crystal quality waveguide of claim 11, wherein said temperature range between 700 and 900C.

20. The low loss crystal quality waveguide of claim 11 further comprising an uppercladding that comprises materials having an index lower than SiGe.

* * * * *